Figure 1:
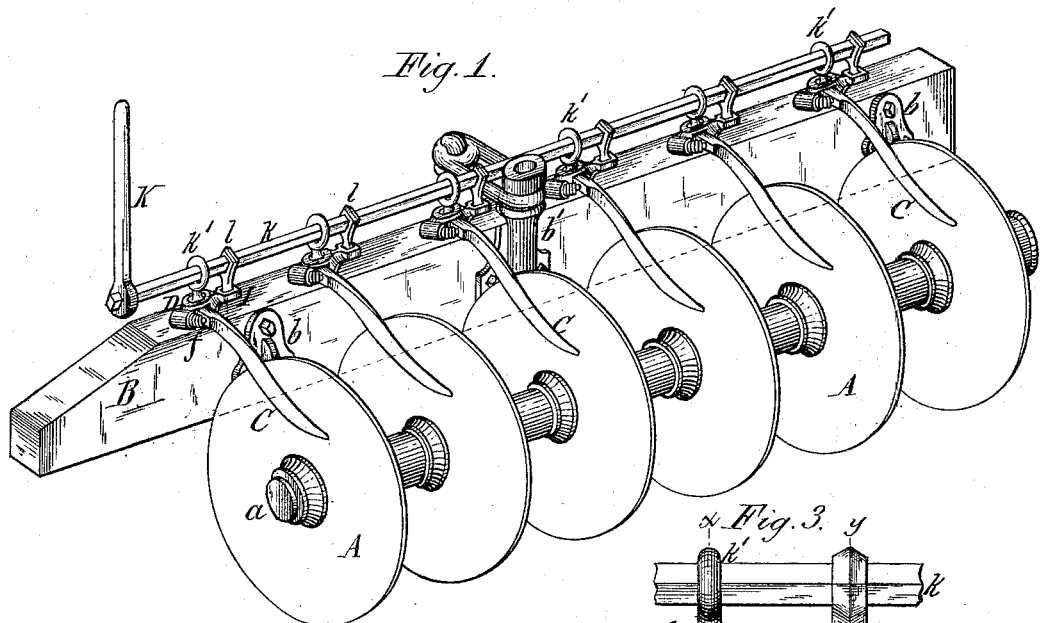

(No Model.)

G. G. CROWLEY.
DISK HARROW.

No. 299,057. Patented May 20, 1884.

Geo. E. Pittman
Theo. L. Popp
Witnesses.

Geo. G. Crowley Inventor.
By Wilhelm Bonner
Attorneys.

UNITED STATES PATENT OFFICE.

GEORGE G. CROWLEY, OF LITTLE FALLS, NEW YORK.

DISK-HARROW.

SPECIFICATION forming part of Letters Patent No. 299,057, dated May 20, 1884.

Application filed January 14, 1884. (No model.)

*To all whom it may concern:*

Be it known that I, GEORGE G. CROWLEY, of Little Falls, in the county of Herkimer and State of New York, have invented a new and useful Improvement in Disk-Harrows, of which the following is a specification.

This invention relates to that class of wheel or disk harrows in which a number of disks are arranged side by side in a gang.
The object of this invention is to provide a simple and efficient mechanism for keeping the several disks clear of earth, weeds, &c.

Heretofore scrapers have been used in connection with these harrow-disks, and such scrapers have been secured rigidly to a sliding bar or a rock-shaft, or they have been pivoted to the gang plank and operated by a sliding bar. In all cases the scrapers have been so connected that all the scrapers were moved simultaneously against the disks or away therefrom, but without permitting any of the scrapers a movement independent of the rest of the scrapers. In a gang of scrapers connected in this manner the difficulty exists that if one of the scrapers is arrested in its movement toward its disk before the other scrapers come in contact with their respective disks, either by the disk being out of true or by a lump of dirt or weeds adhering to the disk, all of the other scrapers will be prevented from coming in contact with their respective disks, and the scraping action of the device will be materially impaired. The object of my invention is to overcome this difficulty and to organize the scraper mechanism in such manner that all of the scrapers will be moved simultaneously, while each scraper is capable of an individual self-adjustment independent of the other scrapers, thereby insuring the contact of all the scrapers with their respective disks when the scrapers are moved against the disks.

My invention consists, to this end, of the improvements in the construction of the scraper mechanism, which will be hereinafter more fully set forth, and pointed out in the claims.

Figure 2:
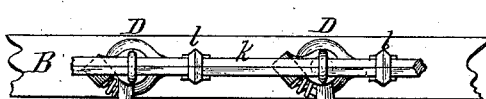
Figure 3:
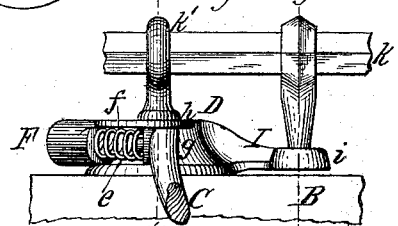
Figure 4:
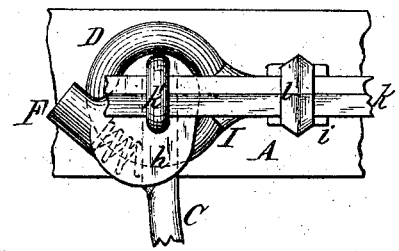
Figure 6:
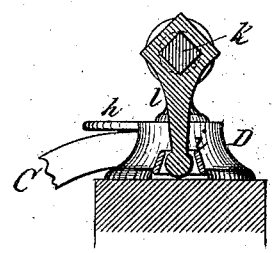
Figure 7:
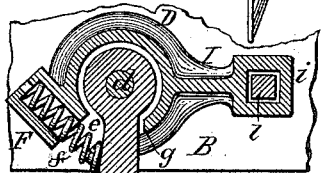
Figure 5:
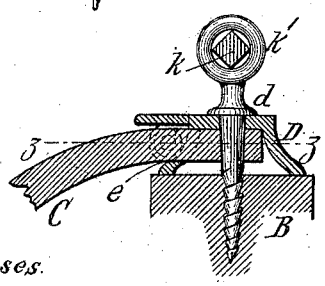

In the accompanying drawings, Figure 1 is a perspective view of a gang of harrow-disks provided with my improved scraper mechanism. Fig. 2 is a top plan view of two disks and scrapers. Fig. 3 is a rear elevation, and Fig. 4 is a top plan view, of the pivoted end of one of the scrapers and connecting parts. Fig. 5 is a vertical section on line *x x*, Fig. 3. Fig. 6 is a vertical section on line *y y*, Fig. 3. Fig. 7 is a horizontal section on line *z z*, Fig. 5.

Like letters of reference refer to like parts in each of the figures.

A represents a series of harrow-disks arranged side by side upon a common shaft, *a*, so as to constitute a gang.

B represents the gang plank or frame, to which the gang of disks A is connected by bearings *b*, or in any other suitable or well-known manner.

*b'* represents the joint whereby the gang-plank B is connected with the harrow-frame, which latter is not shown in the drawings.

C represents the scrapers, which are curved at their lower or rear ends, so as to fit against the concave sides of the harrow-disks, and provided at their upper or front ends with eyes *c*, which turn on vertical pivots *d*, secured to the upper side of the gang-plank B. The perforated front ends of the scrapers C are seated in housings or casings D, which are pivoted to the upper side of the gang-plank by the pivots *d*. The latter pass through openings in the top portions of the casings D and screw into the gang-plank B, as represented in Fig. 5. The front ends of the scrapers C pass through openings *e* in the rear sides of the housings D, as represented in Figs. 3 and 5, and the openings *e* are made long enough to permit of the requisite lateral play of each scraper on its pivot.

*f* represents a spiral or other suitable spring arranged on one side of each scraper, so as to press the scraper toward its disk A. The spring *f* is seated in a socket, F, formed on the housing D, and surrounds a stud, *f'*, formed on the scraper. The spring *f* holds the scrapers C against the end *g* of the opening *e* nearest the disk A, against which the scraper operates. The socket F is provided in its end with an opening for the escape of dirt, &c.

*h* is a flange or plate cast on the housing D, and overlapping the spring *f*, so as to protect the same against weeds, &c.

I represents an arm cast on one side of the housing D, and provided with a socket, *i*, located near the end of the arm.

*k* represents a rock-shaft whereby all of the scrapers of the same gang are moved simultaneously toward or from the disks. The shaft $k$ is supported in eyes $k'$, formed at the upper ends of the pivots $d$.

K is a handle secured to the rock-shaft $k$, for turning the same.

$l$ represents arms secured to the rock-shaft $k$, and engaging with their lower ends in the sockets $i$ of the arms I, so that a rocking motion of the shaft $k$ will produce an oscillating motion of the housings D and of the scrapers C on the pivots $d$. The movement of the housings D is transmitted to the scrapers C by the rigid shoulders $g$ in the direction in which the scrapers are swung away from the disks, and by the springs $f$ in the direction in which the scrapers are swung against the disks A.

Upon turning the shaft or bar $k$ in the proper direction, all of the scrapers C are swung simultaneously against the disks A, and if any of the scrapers should come in contact with the disk or with an obstruction before the other scrapers have come in contact with their respective disks the spring of the scraper which is first arrested in its movement is compressed, as represented in Fig. 2, while the other scrapers move on until they rest against their respective disks. By this means all of the scrapers are brought in contact with their respective disks, notwithstanding any differences which may exist in the forms or location of the several disks.

It is quite common in these disk-gangs that some of the disks are out of true, and in that case some of the scrapers, if constructed in the ordinary manner, bear against the disks, and others do not; but in my improved scrapers this difficulty is avoided, as all of the scrapers are brought in contact with the disks.

I claim as my invention—

1. In a disk-harrow, the combination, with a gang plank or frame, of scrapers pivoted thereto, a rock-shaft mounted on said plank or frame, and pivoted arms or carriers, whereby the motion of the rock-shaft is transmitted to the scrapers, substantially as set forth.

2. In a disk-harrow, the combination, with a gang plank or frame, of scrapers pivoted thereto, a rock-shaft mounted on said plank or frame, pivoted arms or carriers connected with said rock-shaft, and springs interposed between said arms or carriers and the scrapers, substantially as set forth.

3. In a disk-harrow, the combination, with a gang-plank, B, of a scraper, C, pivot $d$, housing D, spring $f$, and rock-shaft $k$, substantially as set forth.

4. In a disk-harrow, the combination, with a gang-plank, B, of a scraper, C, pivot $d$, housing D, provided with an arm, I, rock-shaft $k$, and arm $l$, substantially as set forth.

5. In a disk-harrow, the combination, with the scraper C, of the housing D, provided with a shoulder, $g$, and socket F, a spring, $f$, seated in said socket, and a rock-shaft, $k$, substantially as set forth.

6. In a disk-harrow, the combination, with the scraper C, of the housings D, provided with arms I, pivots $d$, provided with eyes $k'$, shaft $k$, supported in said eyes, and arms $l$, secured to the shaft $k$, substantially as set forth.

Witness my hand this 4th day of January, 1884.

GEO. G. CROWLEY.

In the presence of—
  WATTS T. LOOMIS,
  J. L. ALDRIDGE.